(12) United States Patent
Olsson et al.

(10) Patent No.: US 10,423,313 B2
(45) Date of Patent: Sep. 24, 2019

(54) ALARM DISPLAYING METHOD AND APPARATUS

(71) Applicant: SCHNEIDER ELECTRIC BUILDINGS LLC, Loves Park, IL (US)

(72) Inventors: Per-Ola Olsson, Malmö (SE); Johan Havenberg, Trelleborg (SE); Pontus Rantzow, Trelleborg (SE); Fernando Cano Campart, Malmö (SE)

(73) Assignee: SCHNEIDER ELECTRIC BUILDINGS LLC, Loves Park, IL (US)

( * ) Notice: Subject to any disclaimer, the term of this patent is extended or adjusted under 35 U.S.C. 154(b) by 520 days.

(21) Appl. No.: 15/024,547

(22) PCT Filed: Sep. 25, 2013

(86) PCT No.: PCT/US2013/061596
§ 371 (c)(1),
(2) Date: Mar. 24, 2016

(87) PCT Pub. No.: WO2015/047241
PCT Pub. Date: Apr. 2, 2015

(65) Prior Publication Data
US 2016/0231909 A1    Aug. 11, 2016

(51) Int. Cl.
*G06F 3/0484* (2013.01)
*G06F 3/0482* (2013.01)
(Continued)

(52) U.S. Cl.
CPC ..... *G06F 3/04845* (2013.01); *G05B 23/0272* (2013.01); *G06F 3/0482* (2013.01);
(Continued)

(58) Field of Classification Search
CPC .............. G06F 2203/04803; G06F 12/06
See application file for complete search history.

(56) References Cited

U.S. PATENT DOCUMENTS

| 7,336,278 B2 | 2/2008 | Brooks et al. |
| 7,646,294 B2 * | 1/2010 | Kow .......... G05B 23/0272 340/525 |

(Continued)

FOREIGN PATENT DOCUMENTS

| WO | 2008/124677 | 10/2008 |
| WO | 2013/004654 | 1/2013 |

OTHER PUBLICATIONS

International Search Report and Written Opinion, International Application No. PCT/US2013/061596, dated Apr. 15, 2014 (10 pages).

*Primary Examiner* — Rayeez R Chowdhury
(74) *Attorney, Agent, or Firm* — Kagan Binder, PLLC (57) ABSTRACT

There is provided a method for displaying alarm events to an operator. Alarm events, each being associated with the properties age, state and priority, are received from an alarm generating system. The alarm events are represented by graphical objects which are displayed in a graphical user interface. The sizes of the graphical objects are determined based on at least two of the properties being associated with the alarm event, and the position of the graphical objects is related to the size of the graphical object and/or one or more of the properties being associated with the alarm event represented by the graphical object.

17 Claims, 7 Drawing Sheets

(51) Int. Cl.
*G05B 23/02* (2006.01)
*G06T 11/00* (2006.01)
*G06T 11/20* (2006.01)

(52) U.S. Cl.
CPC .......... *G06T 11/001* (2013.01); *G06T 11/206* (2013.01); *G06F 2203/04803* (2013.01)

(56) References Cited

U.S. PATENT DOCUMENTS

| | | |
|---|---|---|
| 8,321,806 B2 | 11/2012 | Agrusa et al. |
| 2005/0275655 A1* | 12/2005 | Stolze ................... G06T 11/206 345/440 |
| 2007/0268122 A1* | 11/2007 | Kow ................... G05B 23/0272 340/525 |
| 2009/0132673 A1* | 5/2009 | Sprigg ................ G08G 1/0104 709/207 |
| 2010/0020177 A1* | 1/2010 | Carstens .......... G08B 13/19636 348/158 |
| 2010/0049335 A1 | 2/2010 | Assarsson et al. |
| 2010/0238174 A1* | 9/2010 | Haub ................ G06F 3/04812 345/440 |
| 2010/0289638 A1* | 11/2010 | Borchers ............ G05B 23/0272 340/506 |
| 2011/0193704 A1* | 8/2011 | Harper ............... A61B 5/14532 340/573.1 |
| 2012/0119901 A1 | 5/2012 | Hollender et al. |
| 2013/0239038 A1 | 9/2013 | Skidmore et al. |
| 2013/0246213 A1* | 9/2013 | Lee .................... G06O 30/0283 705/26.4 |

* cited by examiner

Fig. 9

ALARM DISPLAYING METHOD AND APPARATUS

CROSS-REFERENCE TO RELATED APPLICATIONS

This application claims priority to International Application No. PCT/US2013/061596, filed Sep. 25, 2013, and titled "ALARM DISPLAYING METHOD AND APPARATUS", which is incorporated herein by reference in its entirety.

TECHNICAL FIELD

The present invention relates to the field of management of alarm events generated by a system. In particular it relates to presentation of such alarm events to an operator.

BACKGROUND

Automation systems, such as building automation systems for large buildings, generate alarm events. An alarm event may for example represent components in the system which fail (such as a broken sensor) or provide an indication that something is wrong, such as a temperature which exceeds a threshold value. The alarm events are presented to an operator who monitors the automation system in order to allow the alarm events to be attended to.

Traditionally the alarm events are presented in the form of a list. This form of presentation originates from the list of alarms from printers used in the old days. However, since a system may generate hundreds of alarms, lists are not the best way to show alarms in order to make it easy to understand what alarm to act on and relate alarms to each other. In particular, there is a risk that important alarms drown in all information in the list thereby making it difficult for the operator to decide which alarms should be attended to first.

U.S. Pat. No. 7,646,294 recognizes the problems with known alarm lists and suggests representing alarms in a graphical user interface. The alarms are graphically represented by individual colored rectangles. The size, color, luminance and pattern of the geometric shape can define the priority of the alarm. The alarms are grouped into clusters in order to facilitate identification of the root cause of an alarm by spatial pattern recognition. However, although the clustering of the alarms suggested in U.S. Pat. No. 7,646,294 may be advantageous when it comes to analyzing the cause of an alarm it is not useful for allowing an operator to decide which alarms to take care of first. There is thus room for improvements.

SUMMARY OF THE INVENTION

In view of the above, it is thus an object of the present invention to provide an improved method and apparatus for presenting alarm events to an operator.

According to a first aspect of the invention, the above object is achieved by a method for displaying alarm events to an operator, comprising the steps of:

receiving alarm events from an alarm generating system, each alarm event being associated with properties being selected from the group: age of the alarm event, state of the alarm event and priority of the alarm event;

representing each alarm event by a graphical object, wherein the size of the graphical object is determined based on at least two of the properties being associated with the alarm event; and displaying each graphical object in a graphical user interface at a position being related to at least one of the size of the graphical object and one of the properties being associated with the alarm event represented by the graphical object.

With this arrangement, each alarm event is thus represented by a graphical object in a graphical user interface. The size of the object is based on at least two of the properties of alarm event. Further, the position is related to the size and/or at least one of the properties of the graphical object. Since the properties (age of the alarm event, state of the alarm event and priority of the alarm event) are all related to the importance of the alarm event, the size as well as the position of the graphical object reflect the importance of the alarm event. Thus, based on the size and position of the graphical objects, an operator may decide which alarm events are the most important ones.

By age of an alarm is generally meant the time (e.g. as measured in minutes) elapsed since an alarm occurred the first time. Alternatively, the age of the alarm may be the time elapsed since the alarm was first acknowledged by the operator. In other words, the starting time point for calculating the age may be defined in different ways. Age is typically calculated using a time stamp for when an alarm was tripped the first time or acknowledged by the operator compared to the current date and time.

The state of an alarm event reflects the life cycle of an alarm. The states that an alarm event may take may be different for different alarm generating systems. For example an alarm event may have the states "normal", meaning that it is not in an alarm state, "alarm", meaning that it is in an alarm state and has not yet been attended to, "acknowledged", meaning that an operator has acknowledged that an alarm has occurred but that the alarm is not yet taken care of, "reset", meaning that the alarm has been taken care of, and "disabled" meaning that the alarm has been inactivated. Some alarm generating systems may also have a state "fault" which indicates that the reliability of the alarm event is low, e.g. that the reliability is below a certain threshold value.

An alarm event is further associated with a priority. The priority is a value that is generated by the underlying alarm generating system. For example the priority may be an integer in the range from 1 to 1000. For some types of alarms the priority may also be linked to the state such that the priority is set per state.

According to an embodiment, the position of each graphical object is related to two of the properties being associated with the alarm event represented by the graphical object, such that the graphical objects are ordered along a first axis depending on a first property and along a second axis depending on a second property. For example, the first property may be the age of the alarm event and the second property the priority of the alarm event. In this way, the graphical objects will be positioned in a two-dimensional diagram. The position of the graphical objects reflect different aspects of the alarm event, such as the age and the priority. Depending on the positions of the graphical objects in the two-dimensional diagram an operator is given a good overview of the importance of the alarm events.

According to further embodiments, the position of each graphical object may be related to three of the properties being associated with the alarm event represented by the graphical object, such that the graphical objects are ordered along a first axis depending on a first property, along a second axis depending on a second property, and along a third axis depending on a third property, the size of the objects or another parameter. In this way the alarm events may be shown in a three-dimensional diagram, thereby providing the operator with more information in a way that allows him to easily take a decision on which alarms to attend first. Also it may be the case that several alarms in a two-dimensional diagram get the same position. If so, by introducing a third axis, these alarms may be distinguished in that they are given different coordinates along the third axis.

In some embodiments, the graphical objects are positioned in a diagram depending on their size. Specifically, the position of each graphical object is related to at least the size of the graphical object. In this way, since the size of the graphical object is a measure of the importance of the corresponding alarm event, the graphical objects are ordered according to their importance along the first axis.

In some cases, the graphical objects are ordered in a one-dimensional diagram. If so, the graphical objects are preferably ordered along a first axis depending on the size of the graphical objects. This allows the operator to easily see which alarms to act on first, namely the ones that corresponds to the graphical objects that have the largest size. Alternatively, the position of each graphical object may further be related to one of the properties being associated with the alarm event represented by the graphical object, wherein the graphical objects are ordered along a second axis depending on said one of the properties of the alarm events. Thus, the graphical objects may be ordered along a first axis depending on their size and along a second axis depending on one of the properties of the corresponding alarm event. For example, the graphical objects may be ordered along the second axis depending on the age of the alarm. In this way more information is added to the graphical user interface. For example, if two alarm events are equal in sized, the further information may be used to decide which one of them is most important to act on.

It is to be understood that the operator may be allowed to switch between the one-dimensional model, the two-dimensional model, and/or the three-dimensional model described above. Also, the operator may be allowed to select different two-dimensional projections of the three-dimensional model. For example, the operator may select to project the graphical objects on a plane defined by the first and the second axes, etc.

As mentioned above, the size of each graphical object is determined based on at least two of the properties. Generally, the size of each graphical object may be determined based on all properties being associated with the alarm event represented by the graphical object. In this way all properties are included in determining the importance (i.e. the size of the graphical object) of the alarm event.

For example, the size may be determined as a weighted sum of numerical values which represent said at least two of the properties being associated with the alarm event. In this way the different properties may be weighted together to form an alarm importance value which is used to determine the size of the corresponding graphical object.

At least one of the properties associated with the alarm events may vary over time. In order to take the time varying properties into account the method may further comprise the step of updating at least one of the size and the position of the graphical objects representing the alarm events over time. In other words, the graphical objects representing the alarm events may be animated such that their size and/or position changes to reflect the change in the properties. For example, as an alarm becomes older the age property increases and thereby also the size of the graphical object representing the alarm. This may be shown in the form of an animation where the size of the graphical object increases. Similarly, the position of the graphical object may be animated. For example, if the positions of the graphical objects depend on their sizes, the graphical objects may be animated such that they move around to new positions in the graphical user interface that reflect their sizes. This is advantageous in that the operator is given a good overview of the changes that occurs with respect to the alarm events.

The properties may be updated by the underlying alarm generating system. For example, the underlying alarm generating system may update the state property when detecting that an alarm has been reset or the age property as an alarm becomes older. Alternatively, an operator may interact with the graphical user interface to update the properties of the alarms. In more detail, the method may comprise receiving a user input relating to at least one alarm event, the user input relating to a change of at least one of the properties associated with the at least one alarm event; and updating at least one of the size and the position of the graphical object representing the at least one alarm event in response to receiving the user input.

As a complement to displaying the graphical objects, a traditional alarm list may also be displayed. More precisely, the graphical objects may be displayed in a first display area of the graphical user interface, and the method may further comprise the step of displaying, in a second display area of the graphical user interface separate from the first display area, the alarm events in a list. The first display area including the graphical objects and the second display area including the alarm list may further be synchronized such that user inputs may be received via the first display area or the second display area, and the list of alarm events (as well as the size/position of the graphical objects) are updated in response to receiving the user input.

The alarm events may be associated with different permissions. For example only alarm events which the operator currently logged on has permission to see may be displayed in the graphical user interface. For this purpose, the method may comprise the step of accessing authorization data defining a subset of the alarm events which the operator is authorized to handle, wherein the step of displaying the graphical objects representing the alarm events comprises displaying only the graphical objects representing the subset of alarm events. In this way the display of the alarm events is filtered with respect to permission.

The display of the alarm events in the graphical User interface may also be filtered in other ways. The operator may make settings which define which alarms will be shown in the graphical user interface. For example, the operator may choose to only see alarm events for which the properties fulfil certain requirements, such as alarm events being older than a certain age, alarm events having a certain state, alarm events having a priority being within a certain interval, or alarm events being within a certain alarm category. Moreover, the operator may define and save one or more custom alarm views which allows the operator to easily choose a preferred view.

According to embodiments, at least one of a color and a shape of the graphical objects may depend on the state of the corresponding alarm events. In this way, the operator may easily, based on the color and/or shape of the graphical objects, deduce information regarding the corresponding state of the alarm events.

According to a second aspect of the invention, the above object is achieved by a computer readable medium comprising computer code instructions which are adapted to carry out the method according to the first aspect when executed on a device having processing capability.

According to a third aspect of the invention, the above object is achieved by an apparatus for displaying alarm events to an operator, comprising:

a graphical user interface;

a receiver configured to receive alarm events from an alarm generating system, each alarm event being associated with properties being selected from the group: age of the alarm event, state of the alarm event and priority of the alarm event; and a processing unit configured to:

represent each alarm event by a graphical object, wherein the size of the graphical object is determined based on at least two of the properties being associated with the alarm event; and display the graphical object in the graphical user interface at a position being related to at least one of the size of the graphical object and one of the properties being associated with the alarm event represented by the graphical object.

The second and third aspects may generally have the same features and advantages as the first aspect. It is further noted that the invention relates to all possible combinations of features unless explicitly stated otherwise.

Generally, all terms used in the claims are to be interpreted according to their ordinary meaning in the technical field, unless explicitly defined otherwise herein. All references to "a/an/the [device, event, message, alarm, parameter, step etc.]" are to be interpreted openly as referring to at least one instance of said device, event, message, alarm, parameter, step etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, where the same reference numerals will be used for similar elements, wherein.

DETAILED DESCRIPTION OF EMBODIMENTS

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled person. The systems and devices disclosed herein will be described during operation.

Figure 1:
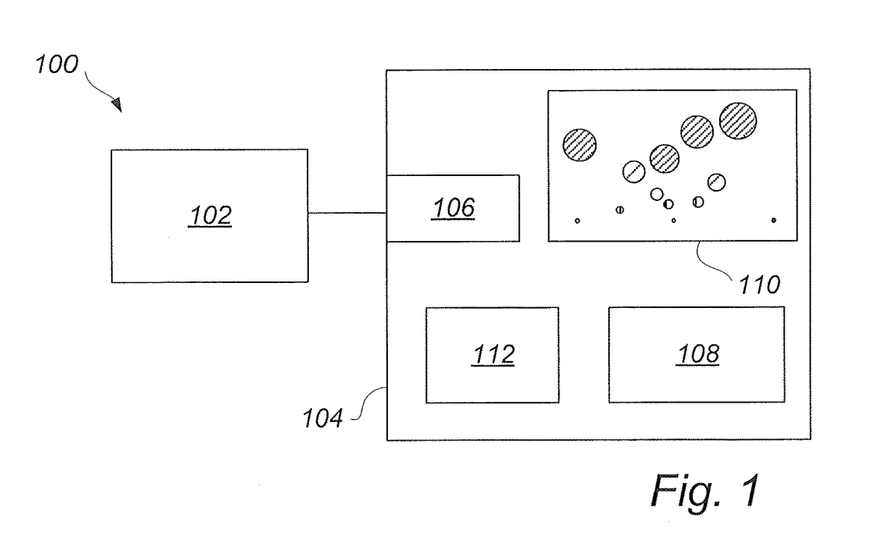
FIG. 1 is a schematic illustration of a system including an apparatus for displaying alarm events to an operator according to embodiments.

FIG. 1 shows a system 100 which comprises an alarm generating system 102 operatively connected to an apparatus 104 for displaying alarm events to an operator.

The alarm generating system 102 may generally be any type of system which generates alarms having properties determining age, state and priority of the alarms. For example, the alarm generating system 102 may be a video/physical access system, IT system, power system, building automation system etc.

The apparatus 104 comprises a receiver 106, a processing unit 108 and a graphical user interface 110. The apparatus 104 may further comprise a memory 112.

The receiver 106 is configured to receive alarm events from the alarm generating system 102. The received alarm events may form example be temporarily stored in memory 112 until they are accessed by the processing unit 108.

The processing unit 108 is operatively connected to the receiver 106 and the memory 112 such that it may access and process the received alarm events as will be described in more detail below.

The processing unit 108 is further operatively connected to the graphical user interface 110 such that it e.g. may display graphical objects representing the alarm events on the graphical user interface 110. The graphical user interface may for example be shown to an operator via any display device known in the art.

The memory 112 may serve to temporarily store information used by the processing unit 108 such as alarm events. The memory 112 may further serve as a non-tangible computer-readable medium adapted to carry software instructions which may be executed by the processor 108. In particular, the software instructions may pertain to a method for displaying alarm events to be explained in more detail in the following.

Figure 2:
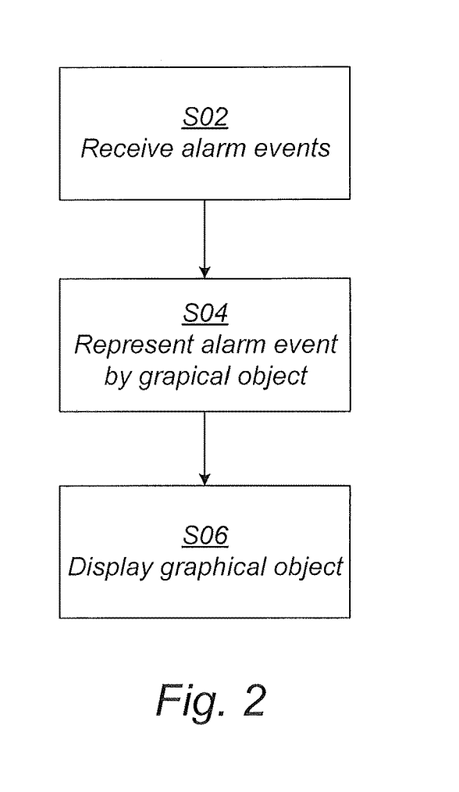
FIG. 2 is a flow chart of a method according to embodiments.

The operation of the apparatus 104 will now be explained with reference to the flow chart of FIG. 2.

In step S02 the receiver 106 receives alarm events from the alarm generating system 102. Each alarm event is associated with a plurality of properties. In particular, each alarm event may be associated with the properties: age of the alarm event, state of the alarm event, and priority of the alarm event. In the following disclosure, the age of the alarm event is the time that has elapsed since the alarm was first triggered. In the following disclosure, for illustration reasons, the state of the alarm event may take the values "alarm", "acknowledged", "reset", "disabled", and "normal". However, it is to be noted that other states, such as a "fault" state as defined above, may be used by some alarm generating systems. The priority value is a value that is set by the alarm generating system according to predefined rules. In the following disclosure, for illustrations reasons, the priority may take integer values from 1 to 1000. However it is understood that the above values of the state and the priority values may be defined differently depending on the particular alarm generating system at hand.

The processing unit 108 then processes the received alarm events. In particular, the processing unit 108 in step S04 represents each alarm event by a graphical object. It should be noted that there may exist some alarm states, such as the "normal" state of the present example, in which the alarm is not activated. Alarm events having such inactivated states are not represented by graphical objects. The processing unit 108 further determines a size of the graphical object. The size of the graphical object depends on at least two of the properties that are associated with the corresponding alarm event. Preferably, however, the size of the graphical objects is determined based on all three properties age, state, and priority of the alarm event since this is found to give a good description of the importance of the alarms. In order to determine the size, the processing unit 108 may determine an alarm importance value (AIV) and then set the size equal to the AIV. For example, the AIV may be determined as a weighted average of numerical values which represent the properties. In particular, the AIV may be determined according to the formula:

$$AIV = (\text{'Prioritized Alarm State'} * \text{Weight}_{Alarm\ state}) + (\text{'Positive Logarithmic Age'} * \text{Weight}_{Age}) + (\text{'Normalized Priority'} * \text{Weight}_{Priority})$$

For example, the prioritized alarm state is a ranking of alarm states using a value from 0 to 9. The default ranking may be (5) Alarm, (4) Acknowledged, (2) Reset, (1) Disable, and (0) Normal. If a fault state is also present it could e.g. have the default ranking (3).

For example, the normalized priority may be a value from 0 to 9 where 0 is the lowest priority and 9 is the highest priority.

The positive logarithmic age is defined as $\max(0, {}^{10}\text{Log}(Age))$. Age is here the time elapsed since an alarm occurred the first time. Age is typically calculated using time stamp for when the alarm was tripped the first time compared to the current date and time.

The parameters $\text{Weight}_{Alarm\ state}$, $\text{Weight}_{Age}$, and $\text{Weight}_{Priority}$ are configurable and suitable default values are 2.0, 1.5, and 1.0, respectively.

In step S06 the processing unit 108 displays each graphical object in the graphical user interface 110. The position of each graphical object is related to at least one of the size (the AIV) and one of the properties of the corresponding alarm event.

Figure 3:
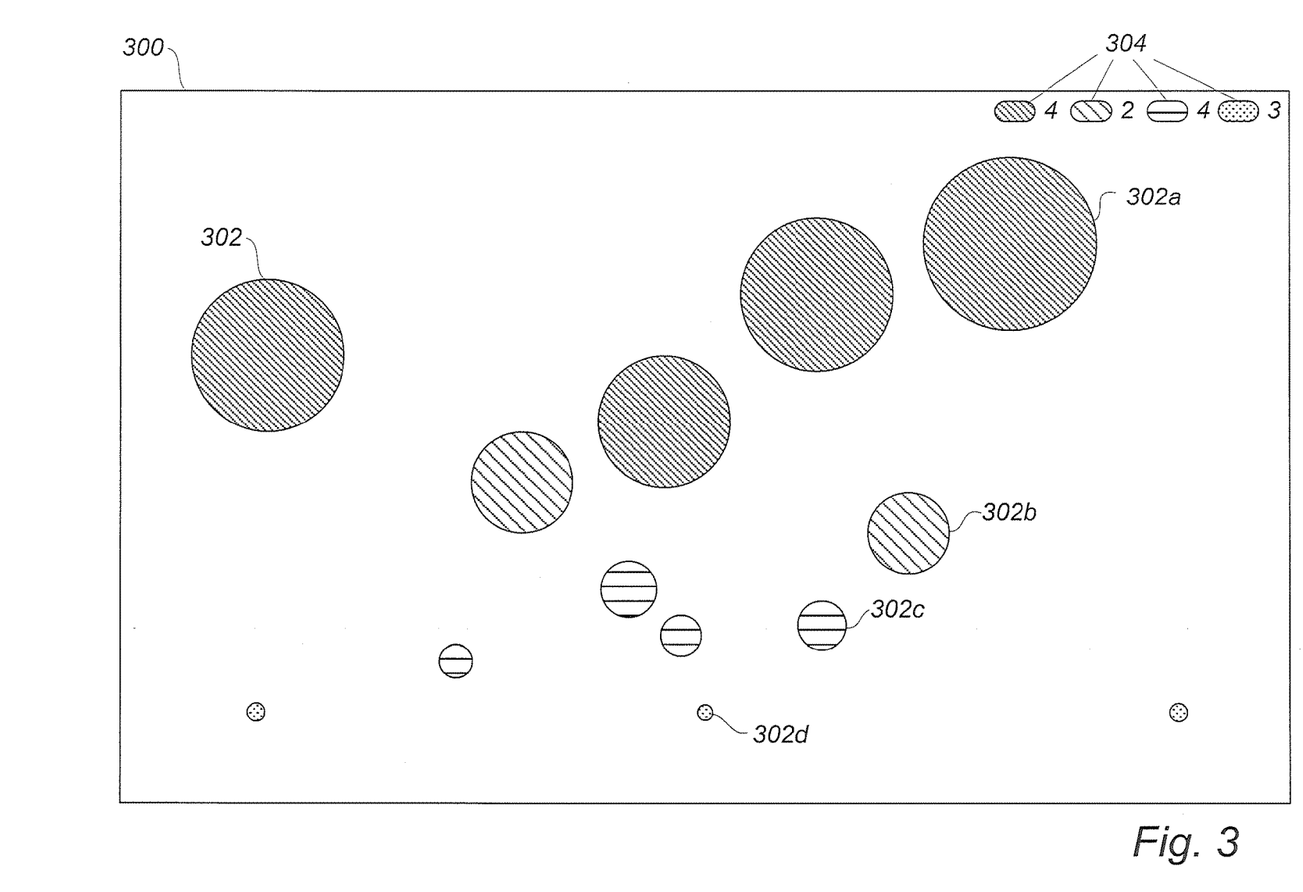
FIGS. 3-4 are schematic illustrations of graphical user interfaces displaying alarm events in accordance with embodiments.

FIG. 3 illustrates a graphical user interface 300 in which the graphical objects 302 are ordered depending on their size. In more detail, the graphical objects 302 are in this case positioned such that the largest graphical objects are at the top and the smallest graphical objects are at the bottom of the graphical user interface 300. More generally, however, the graphical objects 302 may be ordered along a first axis depending on their size. The ordering may be with respect to increasing or decreasing size.

By way of example, the illustrated graphical objects 302 are in the form of circles. However, more generally they may take any form, e.g. they may be circles, squares, rectangles, stars etc. Similarly, in a three-dimensional diagram the graphical objects could for example be represented by spheres, cubes etc. Further, the graphical object may be associated with a color, a pattern and/or a texture. The color, the pattern, and/or the texture may typically indicate different categories of alarms or alarms with different states. In the illustrated example, alarms of four different states are illustrated. For instance, the graphical object 302a corresponds to an alarm event having the state "triggered alarm", the graphical object 302b corresponds to an alarm event having the state "acknowledged alarm", the graphical object 302c corresponds to an alarm event having the state "reset alarm", and the graphical object 302d corresponds to an alarm event having the state "disabled alarm". The number of alarm events in each state may be indicated in the graphical user interface 300, e.g. in terms of visual indicators 304.

In some embodiments the display of the graphical objects may be combined with an alarm list. This is further illustrated in FIG. 4 which shows a graphical user interface 400 having a first display area 402 and a second display area 404. The graphical objects 302 are displayed in the first display area 402, and a conventional alarm list 406 is displayed in the second display area 404.

Figure 4:
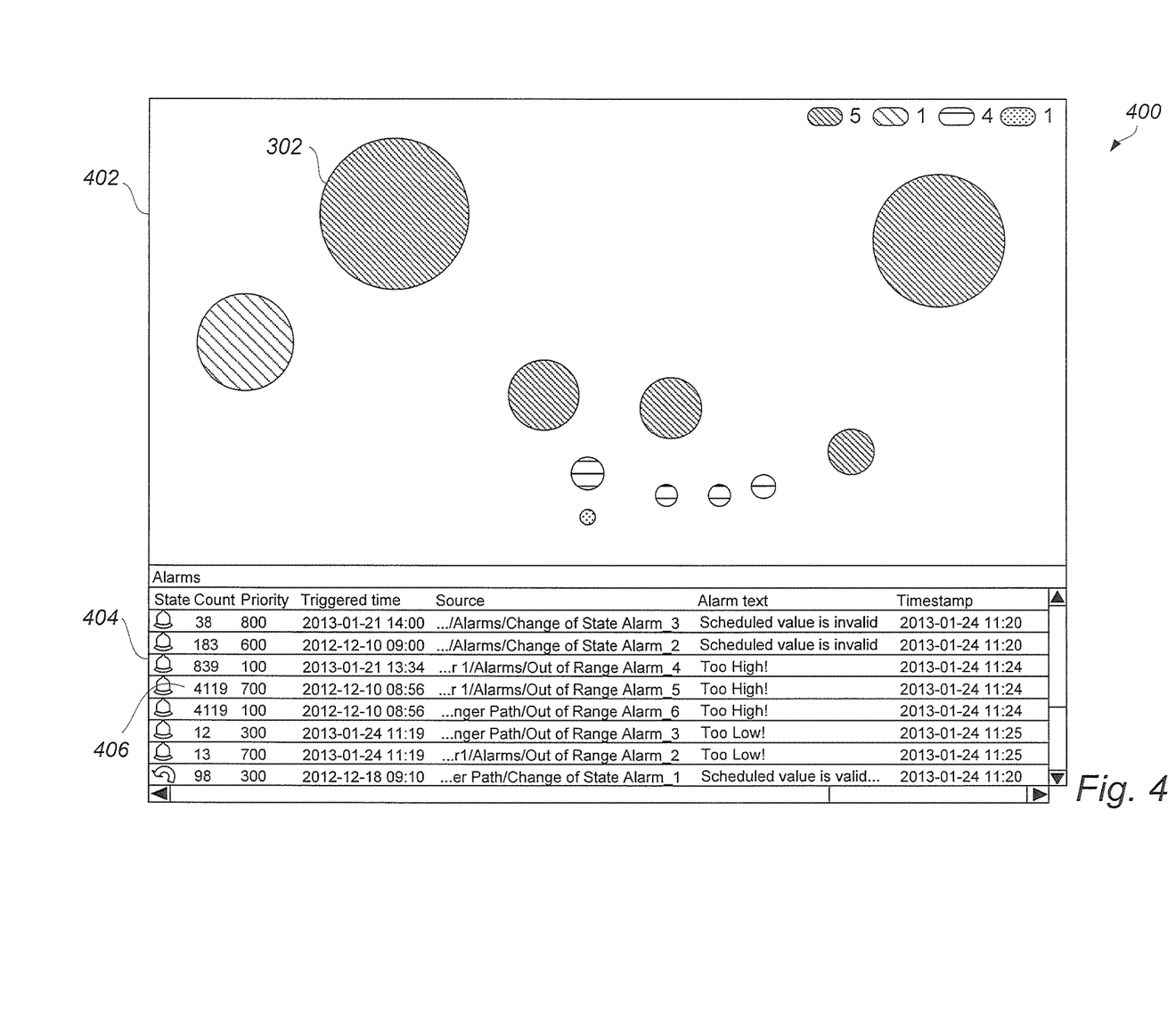

The first and the second display areas are preferably synchronized. This means that selections and commands which are input via the first display area 402 affect the alarm list 406 in the second display area 404 and vice versa.

An operator may interact with the graphical objects 302 shown in the user interfaces 300 and 400 of FIGS. 3 and 4. For example, the operator may select a graphical object 302 to act on the alarm including: seeing additional alarm information/details, act on the alarm using all types of alarm commands e.g. 'acknowledge alarm', 'disable alarm', 'enable alarm', 'assign alarms' etc., navigate to objects associated with the alarm to view information and/or configure objects associated with the alarm, and view alarm attachments. The interaction with the graphical objects 302 can for example be made by clicking (mouse) or pointing (touch interface), dragging a box/area to capture more than one alarm (using mouse our touch), use of keyboard for selection and navigation alarms (e.g. using arrow keys and space/enter). In this way the operator may interact with the alarm events. In particular, the operator may change the properties of the alarm events.

At least some of the properties of the alarm events are time variable. In particular, the age of the alarm and the state of the alarm may vary with time. Also the priority of the alarm may be time variable by virtue of it in some cases being dependent on the state of the alarm.

Since the size of the graphical objects as well as the position of the graphical objects depend on the corresponding alarm event properties, the processing unit 108 may update the size and the position of the graphical objects. In particular, the processing unit 108 may animate the graphical objects 302 to take the time variable properties into account. This will now be explained in more detail with respect to FIGS. 5-6.

Figure 5:
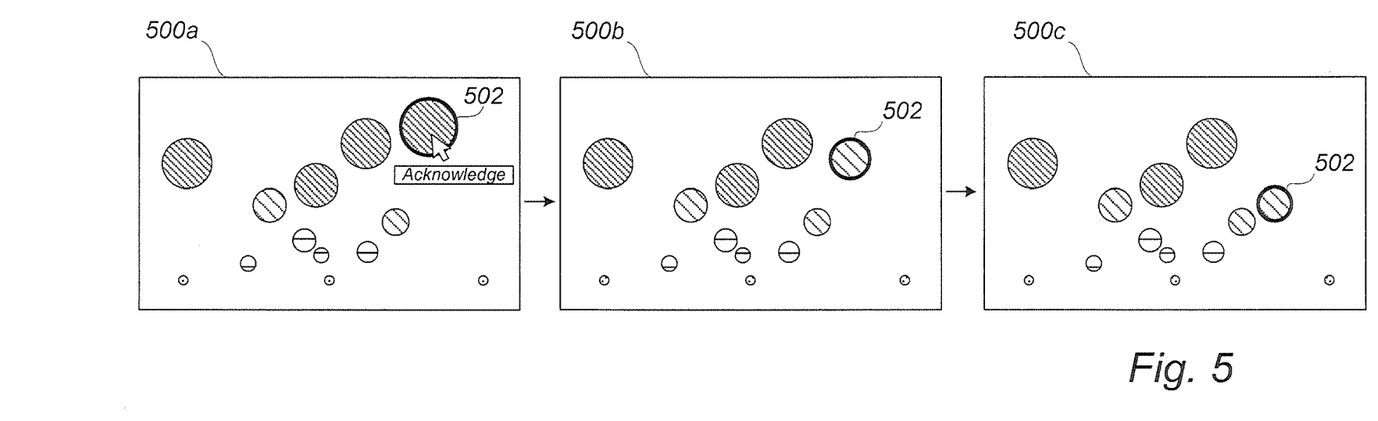
FIGS. 5-6 schematically illustrates animation of graphical objects representing alarm events according to embodiments.

FIG. 5 shows three snapshots 500a-c of a graphical user interface, similar to the graphical user interface 300 of FIG. 1, taken at three points in time. At the first point in time corresponding to snapshot 500a, the operator clicks on the graphical object 502 having the state "triggered alarm" in order to change the state of the corresponding alarm event to "acknowledged alarm". As a result of the change in state, the processing unit 108 updates the size of the graphical object 502, as well as the color of the graphical object 502, as shown in snapshot 500b. In addition, since the position of the graphical object 502 depends on its size, the processing unit 108 updates the position of the graphical object 502. Specifically, the processing unit 108 may animate the update of the size and position such that the graphical object 502 smoothly shrinks to its new size and smoothly moves to the updated position as illustrated in snapshots 500b-c. Moreover, the color of the graphical object 502 may be animated such that it changes color. For the operator, it will hence look as if the graphical object 502 shrinks and sinks downwards, hence reflecting the reduced importance of the associated alarm event.

Figure 6:
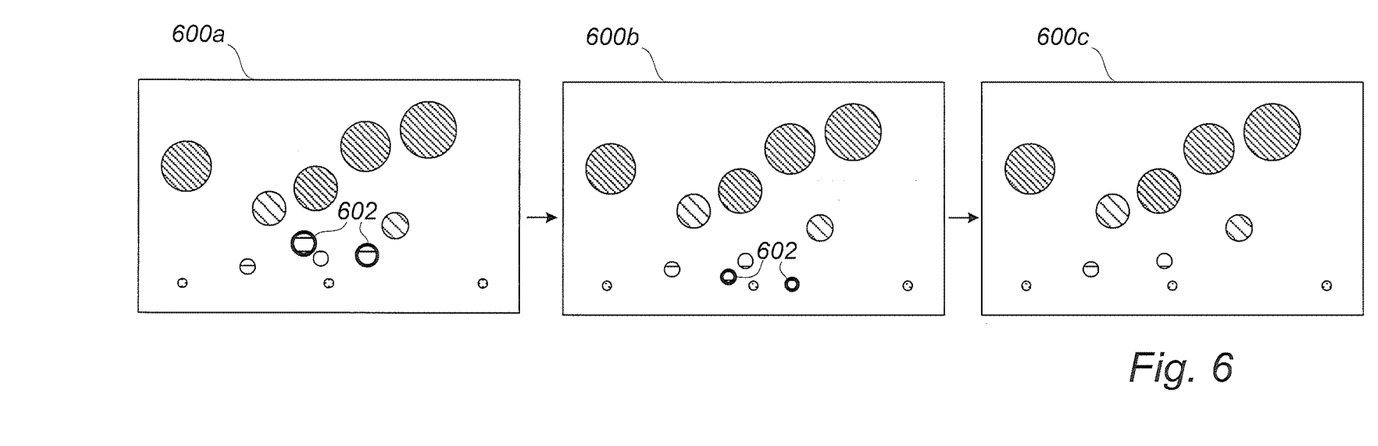

Another example is illustrated in FIG. 6. FIG. 6 illustrates three snapshots 500a-c of a graphical user interface, similar to the graphical user interface 300 of FIG. 1, taken at three points in time. At the first point in time corresponding to snapshot 600a, the alarm generating system detects that the alarm event corresponding to graphical objects 602 have been attended to and therefore sets the status to "normal". As a result of the change in state, the processing unit 108 removes the graphical objects 602. The removal is done smoothly in the form of an animation where the graphical objects 602 shrinks and sinks downwards until they are no longer visible in the graphical user interface, as illustrated by snapshots 600b-c. Alternatively, the removal may be done such that the visibility of the graphical objects 602 is decreased from 100% to 0%. In this way the graphical objects 602 appear to fade away.

Figure 7:
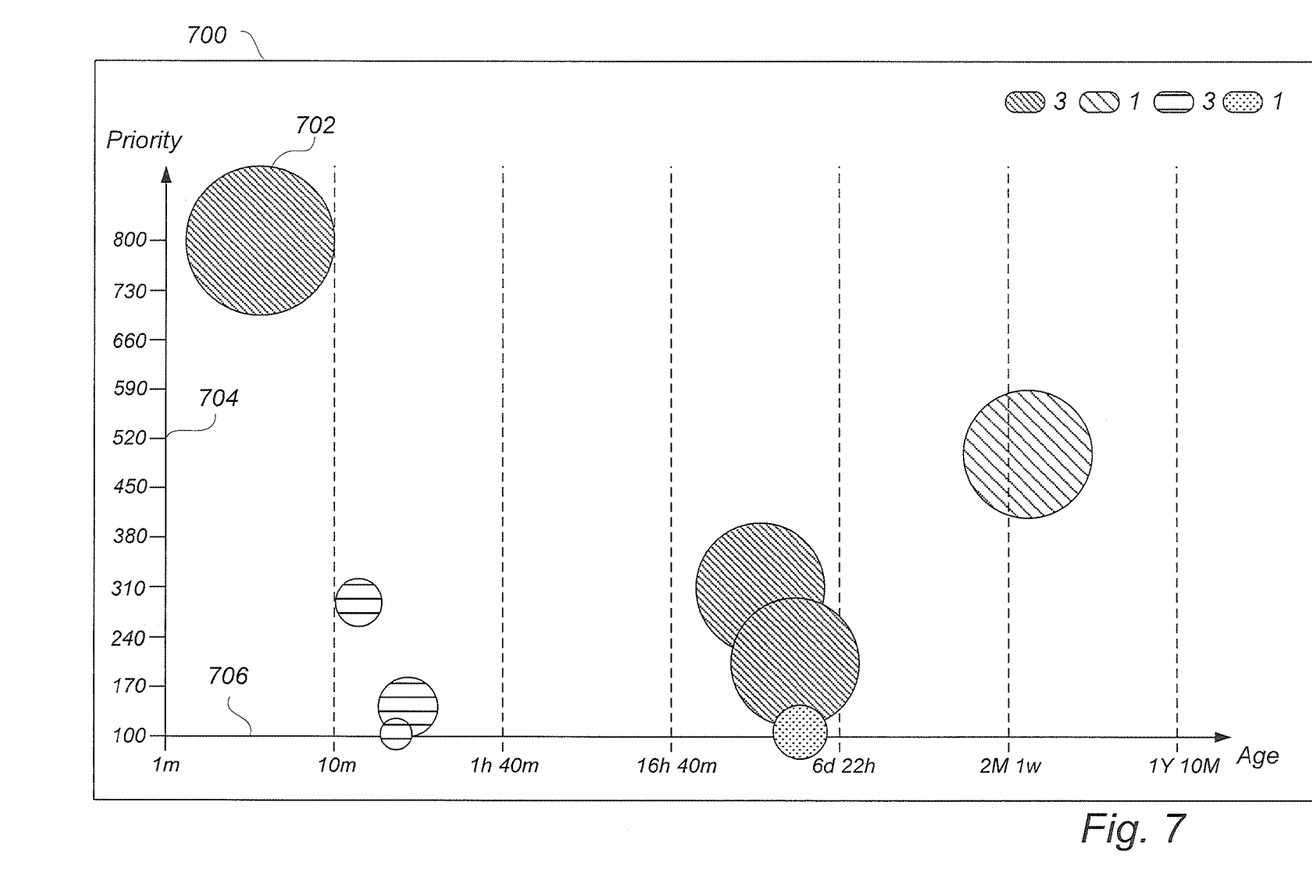
FIGS. 7-8 are schematic illustrations of graphical user interfaces displaying alarm events in accordance with embodiments.

FIG. 7 illustrates a graphical user interface 700 in which alarm events are displayed in the form of graphical objects 702. Similar to the previously described embodiments, the size of the graphical objects 702 are determined based on the properties of the alarm events corresponding to the graphical objects 702. However, in contrast to the embodiment described with reference to FIGS. 3-6, the positions of the graphical objects 702 are related to two of the properties of the corresponding alarm events. In more detail, the graphical user interface 700 comprises a first axis 704 corresponding to the property "priority", and a second axis 706 corresponding to the property "age". Preferably, the second axis 706 has a logarithmic scale. The graphical objects 702 are ordered along the first axis in order of increasing priority. Likewise, the graphical objects 702 are ordered along the second axis 706 in order of increasing age. This allows the operator to base his decision of which alarm is most important not just based on size but also on the priority of the alarm and the age of the alarm. By way of example, alarms being positioned in the upper right region of FIG. 7 may be considered to be particularly important.

Figure 8:
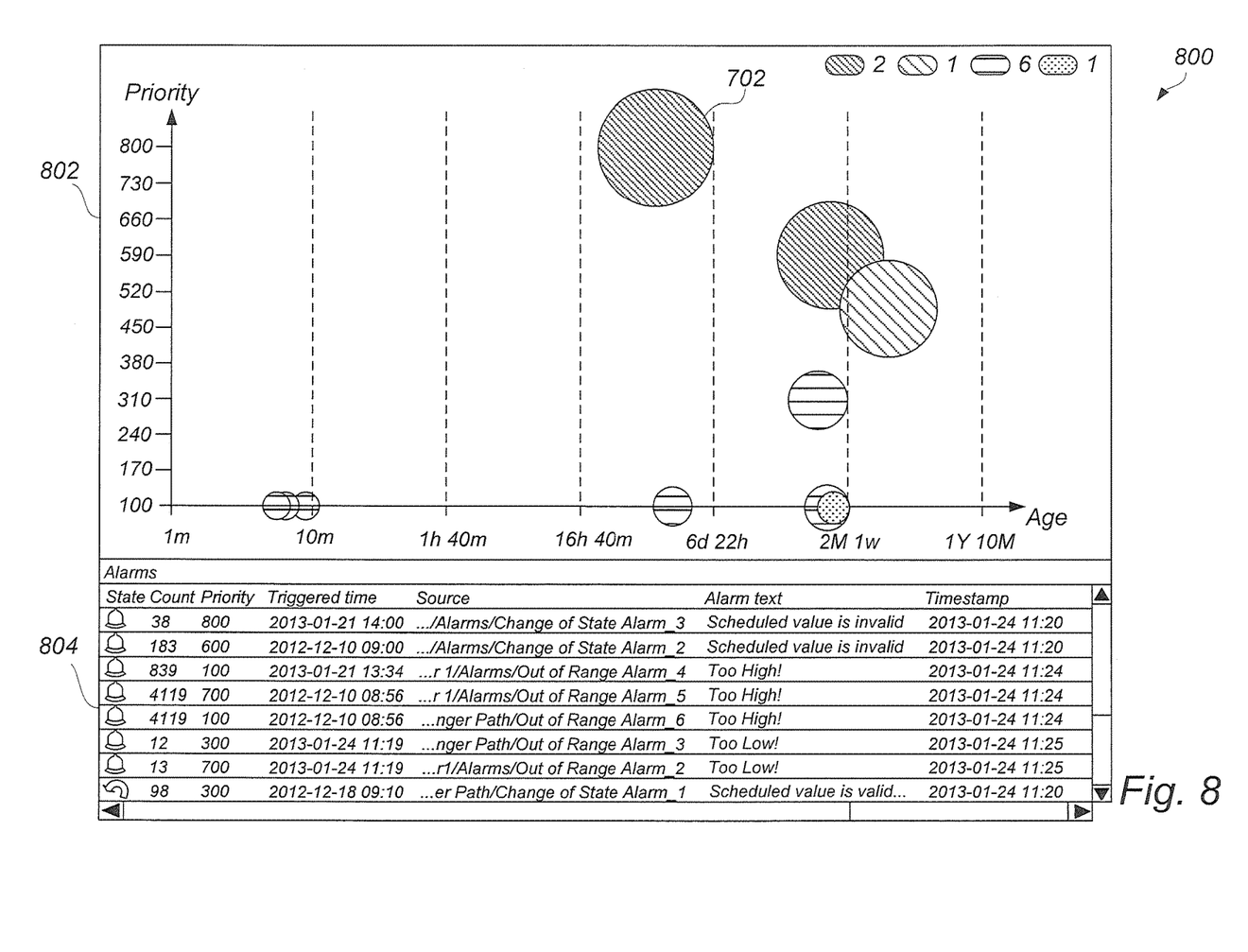

Similar to the graphical user interface described with reference to FIG. 4, the display of the graphical objects 702 as illustrated in FIG. 7 may be combined with a conventional alarm list. This is further shown in the graphical user interface 800 of FIG. 8, where the graphical objects 702 are shown in a first display area 802 and the alarm list in a second display area 804.

Figure 9:
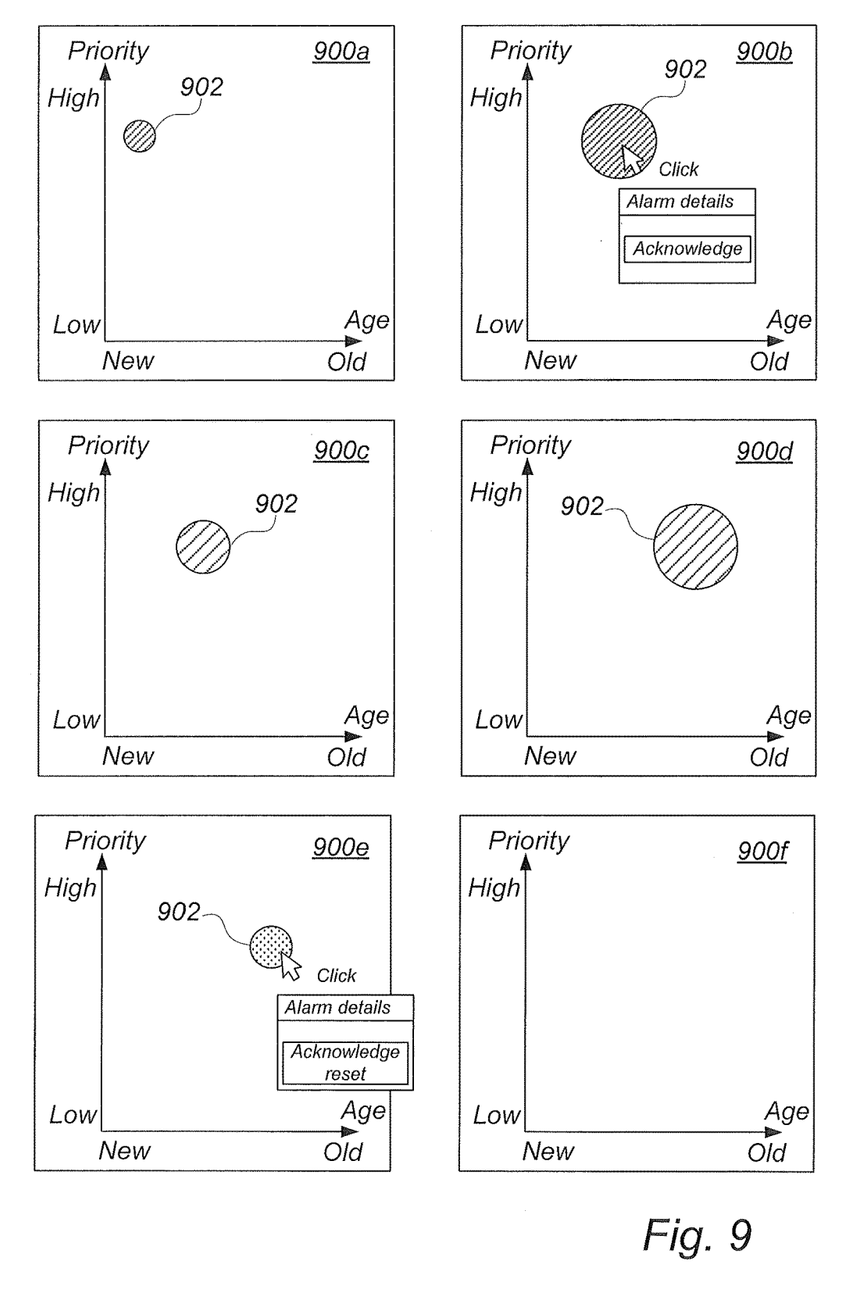
FIG. 9 is a schematic illustration of an animation of a graphical object representing an alarm event according to embodiments.

FIG. 9 illustrates the life time of an alarm event as shown on a graphical user interface. FIG. 9 shows six snapshots 900a-f of a graphical user interface comprising a graphical object 902 corresponding to an alarm event. For illustration reasons, only a single alarm event is shown. However it is to be understood that the graphical user interface may comprise several graphical objects corresponding to several alarm events.

In snapshot 902a a high priority alarm is triggered as illustrated by the graphical object 902. It takes a while before the operator acts on the alarm and therefore the graphical object 902 grows and moves to the right as shown in snapshot 902b. Before going to determine the cause of the problem at the site, the operator clicks on the alarm and changes the state to "acknowledged" as shown in snapshot 902b. As a result, the color of the graphical object changes to a color corresponding to an "acknowledged" alarm, and the graphical object shrinks in size as illustrated in snapshot 900c. It turns out that in order to resolve the problem a broken sensor needs to be replaced. It takes a few days to get a new one. During that time, the alarm event becomes older and therefore the graphical object 902 moves to the right as shown in snapshot 900d. When the sensor is replaced the alarm becomes reset by the system. As a result, the graphical object 902 again changes color and decreases in size as shown in snapshot 900e. In this case the alarm is defined to require acknowledge of the reset state. The operator therefore acknowledges the reset as shown in snapshot 900e. In response to the acknowledgement the reset alarm goes back to the normal state and it disappears from the graphical user interface as shown in snapshot 900f.

It will be appreciated that a person skilled in the art can modify the above-described embodiments in many ways and still use the advantages of the invention as shown in the embodiments above. For example, the graphical objects may be ordered with respect to other properties than the ones illustrated above. Also, the alarm events may be ordered along a first axis depending on size and a second axis depending on one of the properties, such as age. Thus, the invention should not be limited to the shown embodiments but should only be defined by the appended claims. Additionally, as the skilled person understands, the shown embodiments may be combined.

The invention claimed is:

1. A method for displaying alarm events to an operator, comprising the steps of:
   receiving alarm events from an alarm generating system, each alarm event being associated with properties being selected from the group consisting of age of the alarm event, state of the alarm event and priority of the alarm event;
   representing each alarm event by a graphical object, wherein the size of the graphical object is determined based on at least two of the properties selected from the group consisting of age of the alarm event, state of the alarm event and priority of the alarm event; and
   displaying each graphical object in a graphical user interface at a position being related to at least two parameters selected from the group consisting of the size of the graphical object, age of the alarm event, and priority of the alarm event,
   wherein the graphical objects are ordered:
   along a first axis depending on a first parameter selected from the group consisting of size of the graphical object, age of the alarm event, and priority of the alarm event, and
   along a second axis depending on a second parameter selected from the group consisting of size of the graphical object, age of the alarm event, and priority of the alarm event,
   wherein the first parameter is different from the second parameter.

2. The method of claim 1, wherein the first parameter is selected from the group consisting of age of the alarm event, and priority of the alarm event, and the second parameter is selected from the group consisting of age of the alarm event, and priority of the alarm event.

3. The method of claim 1, wherein the position of each graphical object is related to at least the size of the graphical object.

4. The method of claim 3, wherein the graphical objects are ordered along the first axis depending on the size of the graphical objects.

5. The method of claim 1, wherein the size of each graphical object is determined based on all properties selected from the group consisting of age of the alarm event, state of the alarm event and priority of the alarm event.

6. The method of claim 1, wherein the size is determined as a weighted sum of numerical values which represent said at least two of the properties selected from the group consisting of age of the alarm event, state of the alarm event and priority of the alarm event.

7. The method of claim 1, wherein at least one of the properties selected from the group consisting of age of the alarm event state of the alarm event and priority of the alarm event varies over time, the method further comprising the step of:

updating at least one of the size and the position of the graphical objects representing the alarm events over time.

8. The method of claim 1, further comprising the step of:

receiving a user input relating to at least one alarm event, the user input relating to a change of at least one of the properties selected from the group consisting of age of the alarm event, state of the alarm event and priority of the alarm event; and updating at least one of the size and the position of the graphical object representing the at least one alarm event in response to receiving the user input.

9. The method of claim 8, wherein the graphical objects are displayed in a first display area of the graphical user interface, the method further comprising the steps of:

displaying, in a second display area of the graphical user interface separate from the first display area, the alarm events in a list, wherein the user input is received via the first display area or the second display area; and updating the list of alarm events in response to receiving the user input.

10. The method of claim 1, further comprising the step of:

accessing authorization data defining a subset of the alarm events which the operator is authorized to handle, wherein the step of displaying the graphical objects representing the alarm events comprises displaying only the graphical objects representing the subset of alarm events.

11. The method of claim 1, wherein at least one of a color and a shape of the graphical objects depend on the state of the corresponding alarm events.

12. Non-transitory Computer readable medium comprising computer code instructions which are adapted to carry out the method according to claim 1 when executed on a device having processing capability.

13. An apparatus for displaying alarm events to an operator, comprising:

a graphical user interface;

a receiver configured to receive alarm events from an alarm generating system, each alarm event being associated with properties being selected from the group consisting of age of the alarm event, state of the alarm event and priority of the alarm event; and a processor configured to:

represent each alarm event by a graphical object, wherein the size of the graphical object is determined based on at least two of the properties selected from the group consisting of age of the alarm event, and priority of the alarm event; and display each graphical object in a graphical user interface at a position being related to at least two parameters selected from the group consisting of the size of the graphical object, age of the alarm event, and priority of the alarm event, wherein the graphical objects are ordered:

along a first axis depending on a first parameter selected from the group consisting of size of the graphical object, age of the alarm event, and priority of the alarm event, and along a second axis depending on a second parameter selected from the group consisting of size of the graphical object, age of the alarm event, and priority of the alarm event, wherein the first parameter is different from the second parameter.

14. The method of claim 1, wherein the position of each graphical object along the first axis is based on importance.

15. The method of claim 1, wherein the graphical objects are further ordered along a third axis depending on a third parameter selected from the group consisting of size of the graphical object, age of the alarm event, state of the alarm event and priority of the alarm event, and wherein the third parameter is different from both the first parameter and the second parameter.

16. The method of claim 15, wherein the first axis represents the age of the alarm event, the second axis represents the state of the alarm event, and the third axis represents the priority of the alarm event.

17. The method of claim 1, wherein each alarm event is associated with each of the properties selected from the group consisting of age of the alarm event, state of the alarm event, and priority of the alarm event.

* * * * *